Patented Sept. 17, 1929

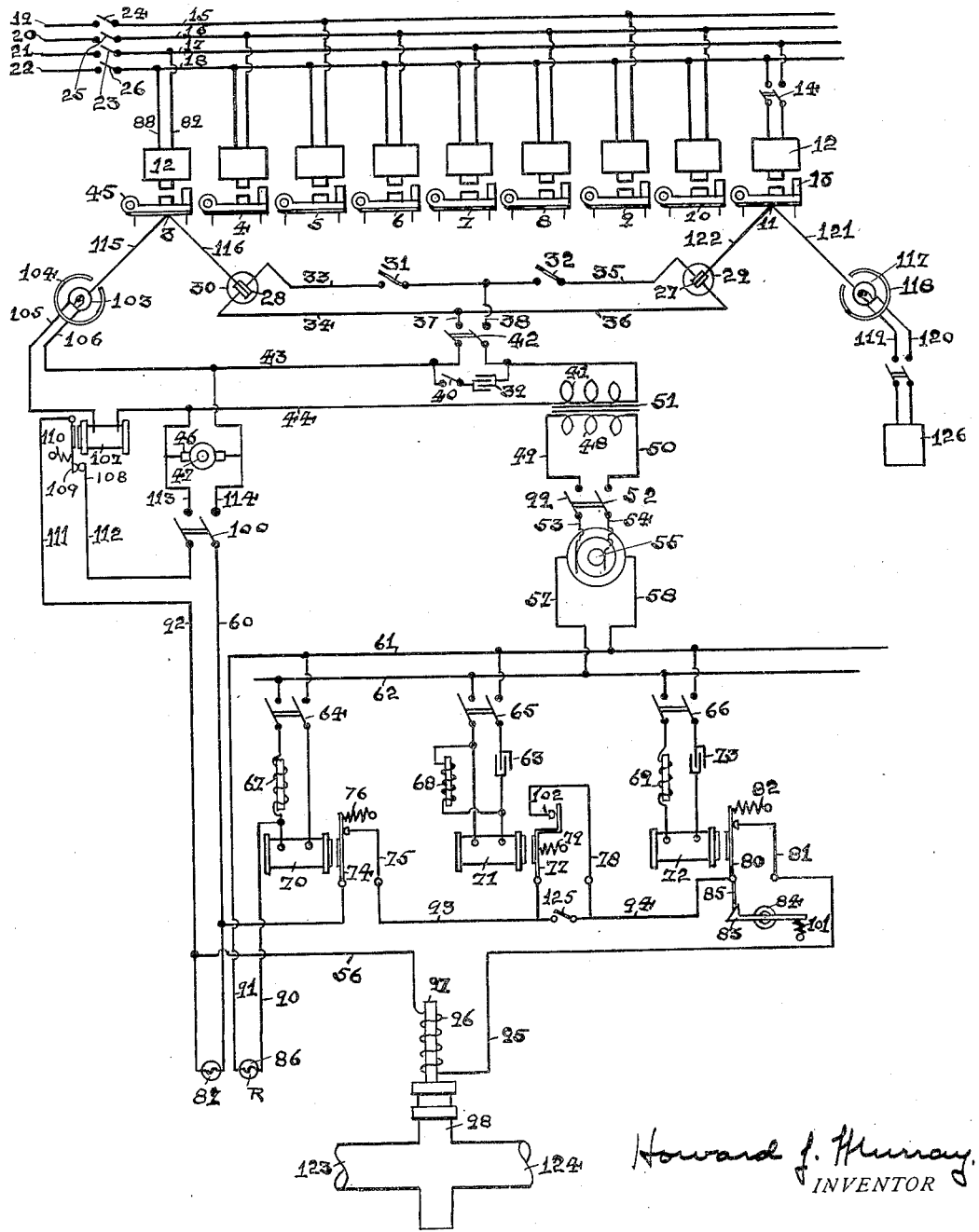

1,728,187

UNITED STATES PATENT OFFICE

HOWARD J. MURRAY, OF BROOKLYN, NEW YORK

REMOTE-CONTROL SYSTEM

Application filed April 7, 1928. Serial No. 268,330.

My invention in general relates to improvements in methods of controlling vehicles by the action of reflected light on a light affected circuit organization.

According to my invention, a plurality of rays of reflected light are employed in such a manner that the said rays will control a light affected circuit organization according to the rate the said reflected rays are intercepted by the said organization.

One of the objects of my invention is to change the status of a light susceptible circuit organization in approximate synchronism with the interceptions of a plurality of reflected rays of energy, whereby an alternating current in effect will be caused to flow in certain portions of the said circuit.

Another object of my invention is to provide means designed to intercept rays of selectively reflected light at a desired rate so as to cause alternating current to flow in a light susceptible circuit organization with a frequency corresponding to the said rate of interception.

Still another object of my invention is to provide means designed to be selectively actuated by certain alternating currents resulting from the action of intercepted reflected light on a light susceptible circuit element.

My invention also contemplates the use of a plurality of rays of reflected energy intercepted singly or together at the same or at different rates, and a plurality of light affected circuit elements arranged to affect the same or different circuits.

My invention still further contemplates the remote control of a movable vehicle by a combined action of alternating currents from a plurality of sources. Since two or more sets of reflected beams may be intercepted at different rates at the same time, I am able to remotely combine alternating currents of different frequencies corresponding to different rates of light interception.

An additional object of my invention is to provide means to selectively reflect beams of light.

In conclusion my invention contemplates the interception of remotely reflected beams of energy at desired consecutive sequencies thereby to convert direct current into alternating currents of desired frequencies.

In order to explain the theory of action which is believed to underlie the principles of my invention, let it first be assumed that means are provided for supplying and desirably positioning a plurality of sources of beams of light. Let it further be assumed that a ray affected circuit organization including a ray affected resistance changing element is positioned relative to the paths of the said beams. Let it also be assumed that the said circuit organization also includes a source of electric current, current amplifying means, portions in which alternating current of a given frequency cannot flow with sufficient strength to operate a certain control element, other portions in which an alternating current with a given frequency may flow to operate a control element, current generating means operatively connected to the movable vehicle, and suitable power control elements. Let it still further be assumed that means are positioned remotely relative to the said source of said light beams so as to selectively reflect the said beams of light.

Now if the said reflected rays are intercepted regularly at a given rate (say 40 times per second) by the said ray affected element, then the resistance of the day affected circuit organization including the ray affected element will be varied at the same rate. If the varying current is conducted through the primary winding of a transformer it is evident that an alternating current in effect will be induced in the secondary winding of the said transformer. This alternating current will have the same frequency as the said rate of reflected beam interception.

If the rate of interception is changed by a change in speed of the said vehicle, or a change in the number of reflecting surfaces, the frequency of the induced current will accordingly be changed to the same extent. Hence it is possible by means of intercepting rays of reflected energy at a given rate to selectively convert direct current to alternating current of a desired frequency. This current may then be amplified in any suitable manner. The amplification may occur before the conversion to alternating current if it is desired.

According to this invention this amplified current is conducted to a plurality of impedance coils and condensers certain of which are designed to offer a minimum impedance to a current of a given frequency. Accordingly as the rate of ray interception is increased from a minimum rate to a maximum rate, an alternating current will also be induced in the said secondary winding with a corresponding increase of frequency. As the frequency reaches a given predetermined value the current will selectively flow through the impedance coil circuit designed for the said given frequency. The invention therefore provides a means of selectively diverting, at a remote point, current to a given circuit.

If suitable relays are operatively placed in the circuits of these individual impedance coils, it is evident that each of these said relays may be selectively actuated by varying the rate of reflected ray interception. Therefore, according to my invention it is possible to selectively actuate at a remote point a plurality of circuit closers or elements in any desired sequence, this selective actuation to be effected by intercepting selectively reflected beams of light at a certain rate.

My invention also contemplates the use of controlling means operatively associated with the said relays, and arranged to be actuated by the relays to affect the motion of a vehicle.

Various other objects and advantages of my invention will in part be obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

The figure is largely a diagrammatic view of the arrangement of means embodying a preferred form of my invention and the necessary connections to properly complete a working circuit organization.

In the following description and in the claims parts will be identified by specific names for convenience of expression, but they are intended to be as generic in their application to similar parts as the art will permit.

As the invention may be admirably embodied in a remote train control system it will be described in connection with such a device, but it will be obvious that the invention is not so limited, but may be utilized wherever a ray sensitive circuit organization may be moved to intercept a plurality of reflected rays in desired sequence.

In the drawings there are illustrated largely diagrammatically a plurality of sources of reflected radiant energy such as light, altho it is within the scope of this invention that the said radiant energy could be of any known form such as heat. These sources are identified as reflectors 3 to 11 inclusive, and any number of these reflectors could be added for certain desired conditions. These reflectors are connected in a conventional manner to a series of feeders such as 15, 16, 17, and 18 operatively connected with a signal system organization of which leads 19, 20, 21 and 22 are a portion by means of the positions of switches 23, 24, 25, and 26. Reflectors 3, 7, and 11 are connected to feeders 17 and 18. Reflectors 4, 6, 8 and 10 are connected to feeders 16 and 18. Reflectors 5 and 9 are connected to feeders 15 and 18. Each reflector is moved about an axis 45 by a magnet 12 designed to be selectively actuated by the current supplied by leads 19, 20, 21 and 22, and the magnets and reflectors are positioned as hereinafter described. It is obvious that I could control the reflectors by magnetically controlled shutters, or that a mechanical shutter could selectively control the beams.

There are also shown in the figure a plurality of light sensitive circuit elements as 27 and 28 which may be of any conventional type now known in the art, and enclosed if desired in a vacuous container as 29 and 30. The said elements in this particular embodiment are connected in multiple with a connection to a circuit including a source of power and an inductive element 41 forming the primary winding of a transformer 51. The circuit is connected to the said source of power 46 by leads 43 and 44 and double pole switch 42. The said source of power in this embodiment is a conventional direct current generator with commutator 46 driven by a shaft 47 from a power member (not shown) of the moving vehicle. The light sensitive element 27 is connected to this circuit through switch 32 by means of leads 35 and 36, and the element 28 is connected to the circuit through switch 31 by means of leads 33 and 34. A condenser 39 is also connected across the leads 37 and 38 when switch 40 is closed.

The element 28 is positioned relative to the plurality of reflecting surfaces such as 3—11 so as to receive a reflected beam 116 when moved relative thereto. The source of the reflected beam 116 is the light producing element 103 energized by leads 105 and 106 connecting same to the armature 46 through a relay 107. The light source 103 is assumed to be fixed relative to the light affected element 28 so that its beam 115 will be reflected by the surfaces 3—11 when same are moved relative to the elements 28 and 103. The light susceptible element 27 is also positioned relative to a light source 117 so that the beam 121 will be reflected by the surfaces 3—11 as a reflected beam 122 and intercepted by the said element 27 as the said surfaces 3—11 are moved relative to the said elements 27 and 117. The beam 115 may be concentrated by reflector 104, and the beam 121 by the reflector 118.

The secondary winding of transformer 51 is shown connected to switches 99 and 52 through leads 49 and 50. When these switches are closed to conductors 53 and 54 current is led to a current amplifying device which in this particular description may be designated as a uni-polar generator. It is within the scope of this invention however to employ any known form of current amplifying organization such as the well known electron tube system. Uni-polar generators are well known and a description of operation is not considered necessary to those skilled in the art. However, I claim as new the idea of supplying an alternating current to the field of a uni-polar generator in order to generate a stronger alternating current of the same or proportional frequency in combination with a reflected light signal control system. The uni-polar generator has a motor 55 which may be considered as the rotating field member, and is preferably driven from the same shaft as the armature of the direct current generator 46. The amplified current from the said uni-polar generator is delivered to busses 61 and 62 by conductors 57 and 58 connected to the stationary stator or armature of the said generator.

Connected to the busses by double pole switches 64, 65 and 66 are a plurality of selective circuits including impedance elements 67, 68 and 69; condensers 63 and 73; and relays 70, 71 and 72. When the said switch 64 is closed the impedance 67 and relay 70 are placed in circuit. In a similar manner when switch 65 is closed are impedance 68, condenser 63, and relay 71; and impedance 69 and relay 72 are in series with condenser 73 when switch 66 is closed.

Each of these relays is provided with a circuit controlling armature associated with a circuit affecting element. For example, relay 70 has an armature 74 normally in circuit closing relation with contact element 75 due to the tension of spring 76. Relay 71 is equipped with an armature 77 normally in circuit opening relation with contact element 102 due to the pull of spring 79. Relay 72 is equipped with an armature 80 normally in circuit closing relation with contact element 81 due to the pull of spring 82. Relay 72 differs from relays 70 and 71 in that the armature 80 cannot be returned to a circuit closing position by the pull of the spring 82 unless the latch 83 has previously been rotated about the shaft 84 so as to release the portion 85 of the armature 80 from the lip of the said latch. It is evident that the other relays could have been so equipped.

There is also shown an indicator means 86 such as lamp R supplied with current through impedance coil 67 and lead 90, and connected to the buss 61 through conductor 91.

In addition there is shown by the figure a power control element such as 98 assumed for the sake of description to be a steam control valve. It is within the scope of this invention that the element 96 could be a power control element designed to control both the steam and air system of a steam locomotive. In addition it could be considered as a control of the currents and air system of an electric locomotive. In general it is assumed to be a control element of any type of movable vehicle. This element 98 is assumed to be actuated to an operative or inoperative condition by means of the magnetic plunger 97. This plunger in turn is actuated by the presence or absence of current in the winding 96.

For the sake of description the plunger 97 in this particular description is assumed to be restrained against opposing forces by magnetic force due to the current in the winding 96. In addition the valve 98 is assumed to close or open when the said current ceases to flow. The current for energizing the winding 96 is obtained from the direct current generator commutator 46. It may also be obtained from any other suitable source of current. This circuit of which the winding 96 is a portion includes the leads 56, 92, 60, 111, 112, 113, and 114. The lead 60 is connected to armature 74 of relay 70, and also includes lead 93, switch 125, armature 77, contact 102 and lead 78 in parallel with switch 125, and lead 94 to armature 80 of relay 72. The circuit is completed by contact 81 and lead 95 to the winding 96.

In operation let it be assumed that the feeders 19, 20, 21, and 22 are operatively connected to a signalling system designed to control the signals indicating proper movements of vehicles such as railway trains. Let it also be assumed that the switches 23, 24, 25, and 26 are normally closed to connect the leads 15, 16, 17, and 18 to a desired signal system, and that when the so-called "proceed" signal of the said signal system is in operation the reflectors 3, 7, and 11 will not be actuated or moved by the magnets 12 associated therewith, and that all the remaining reflectors as 4, 5, 6, 8, 9, and 10 will be moved or actuated, so that a reflected beam as 116, or 122 will only be reflected by reflectors 3, 7, and 11 to the light affected elements 27 and 28; when the so-called " proceed with caution " signal is in operation that reflectors 3, 5, 7, 9, and 11 will not be actuated or moved; and that when the so-called " stop " signal is in operation that none of the said reflectors will be actuated or moved. It should also be obvious that when the signal system is inoperative that none of the said reflectors will be moved as the magnets 12 will not be operative, and the reflectors will automatically be in a " stop " status.

Now let it be assumed that all the other means shown on the figure, except the signal system and reflectors are positioned on a movable vehicle such as an element of a railway train, and that the light sensitive resistance changing element 27 is positioned to desirably intercept a beam of light from source 117 when properly reflected by the action of the reflector 11. According to my invention a plurality of light sensitive elements such as element 27 may be employed. Accordingly a second light sensitive element 28 is so positioned on the said movable vehicle that the said element 28 intercepts the reflected beam 116 of source 103 at the same time that the element 27 intercepts a beam 122 from reflector 11 and source 117. Reflector 11 is assumed to be the first of a second series of reflectors such as 3—10. With reflector 11 removed element 28 will intercept the beam 116 reflected from reflector 3 and source 103 at the same instant element 27 would have intercepted reflected beam 122 from reflector 11 and source 117. It is assumed that the vehicle is moving in a direction from left to right when facing the drawing. Hence the two elements 27 and 28 will together intercept the beams of all the reflectors in a desired consecutive manner. By this arrangement of a plurality of light affected elements I am able to reduce to number of reflectors required for a given condition. It should also be obvious that any number of elements such as 27 and 28 may be employed to cause a continuous interception of reflected beams of light by the combined action of a sufficient number of the said elements. For example a reflected light affected element could be placed on each car of a train, or they could be desirably spaced so as to secure a desired sequence of interception. It would also be possible to have different elements intercepting reflectors at different rates. This could be accomplished by varying the spacing of the reflectors in desired combinations, and also by providing a plurality of light sources arranged so as to reflect light to a plurality of reflectors in different relative planes.

As the said movable element 27 consecutively intercepts beams of light from any or all of the reflectors as 3—10 its normal resistance will be changed according to the well known and accepted action of light affected resistance changing elements. A similar resistance change will also occur in the element 28 as the continued movement of the said vehicle from left to right carries the said element to intercept the reflected beams as 116 of the source of light 103 so that the reflected beams impinge on its active surface. Accordingly the electric current flowing in the circuit including the source of current as armature 46, leads 43, 44, 37, and 38, switch 42, and primary transformer winding 41 will be changed in synchronism as a result of the change of resistance in the said elements 27 and 28. If the said reflectors are equally spaced and the movement of the said vehicle is uniform, a uniformly changing or varying current will be caused to flow in the primary winding 41 of transformer 51. A condenser 39 is connected if desired across the leads 37 and 38 by means of switch 40 in order to sharpen the said variation. This action of condensers is well known and no further description of the action is considered necessary.

With a varying current flowing in the primary winding 41 of transformer 51 an alternating current in effect will be induced in the secondary winding 48. This current will be conducted to the current switches 99 and 52, and when same are closed, to conductors 53 and 54. This alternating current will have a cycle for the interception of each beam of light by the elements 27 and 28. The interceptions of light beams will depend on the number and spacing of the said reflectors, and the rate of interception for a given condition will depend on the speed of the said vehicle. Hence the frequency of the said induced current will depend on the spacing and number of reflectors and the speed of the said vehicle.

According to my invention, I am able to selectively control the reflection of the beams 116 and 122 due to movement of the reflecting surfaces of the said reflectors, either manually, or due to the selective control of the said signal system so the angle of the reflected beams such as 116 and 122 will be such as to prevent interception of same by the elements 27 and 28. Or the surfaces may be rendered non-reflecting. For the purpose of this description let it be assumed that the reflectors are controlled by the said signal system. When the so-called "proceed" signal of the said system is operative reflectors 3, 7, and (11) are assumed to be in position to reflect the said beams to the active surfaces of the elements 27 and 28, or perhaps some type of light reflecting element similar to the said reflectors is affected by energizing conductors 15, 16, and 18 so as to leave only reflectors 3, 7, and (11) in normal unmoved position.

The speed of the vehicle will be considered to be such for a given instant that (say) a frequency of 40 beams of reflected light per second will be intercepted by the elements 27 and 28, or 27 or 28. Consequently an alternating current with a frequency of 40 cycles per second will be delivered to the switches 99 and 52. When the so-called "proceed with caution" signal is operative reflectors 3, 5, 7, 9, and (11) are assumed to be left in normal reflecting position, and with the train moving at the same speed as above described a rate of 80 reflected beams per second will be intercepted by the said elements and therefore the current delivered to the switches 99 and 52 will have a frequency of 80 cycles per second. All of the reflectors are left in a normal reflecting position when the so-called "stop" signal is operative and assuming that the said train has not changed its speed a current with a frequency of 160 cycles per second will be delivered to the switches 99 and 52. Hence my invention provides means to selectively produce a plurality of alternating currents at remote points by the action of a plurality of reflected beams of light.

Now let it be assumed that the speed of the said train is reduced to a speed of (say) 30 miles per hour from the previous speed of 60 miles per hour. When the "proceed" signal is operative the induced current in winding 48 will have a frequency rate of ½ the frequency rate at the 60 mile train rate, or a frequency rate of 20 cycles per second. When the so-called "proceed with caution" signal is operative the said induced current will have a frequency rate of 40 cycles per second because double the number of reflected beams are intercepted in the same interval of time, and when the so-called "stop" signal is in operation the induced current will have a frequency rate of 80 cycles per second because four times the number of reflected beams are intercepted in the said interval of time. If the said train is still further retarded to (say) 15 miles per hour, the frequency rates of the said induced current will be as follows. For "proceed" 10 cycles; for "caution" 20 cycles; and for "stop" 40 cycles per second. For any proportionate speed the frequency rate will be in proportion.

The rate relation may be more clearly defined by reference to the following table.

| Speed of vehicle | 60 | 30 | 15 | 0 |
|---|---|---|---|---|
| Cycle rate for "proceed" | 40 | 20 | 10 | 0 |
| Cycle rate for "caution" | 80 | 40 | 20 | 0 |
| Cycle rate for "stop" | 160 | 80 | 40 | 0 |

It should be noted in passing, that the same frequency is generated under the following conditions; when train is moving 60 M. P. H. against a "proceed" signal; when moving 30 M. P. H. against a "caution" signal; and at 15 M. P. H. against a "stop" signal.

Hence there is delivered to the switches 99 and 52 an alternating current with a frequency proportional to the speed of the train and the status of the said signal system.

When the switches 99 and 52 are closed the induced current is conducted to a current amplifying means by conductors 53 and 54. The current may be amplified by any of the known and accepted means of amplifying current, but I employ a uni-polar generator in a new and novel manner. The induced current from the secondary winding 48 is used as the exciting current for this generator, and consequently the generated current will have the same or a proportional frequency and will be of a greater magnitude. While this method of amplification would not be very efficient for complex currents such as voice currents, I find that an alternating current with an approximately uniform frequency may be successfully amplified by this form of generator. However, my invention is not so limited, and it is understood that any known means may be used.

This amplified current is conducted to the busses 61 and 62. Connected to these busses are a plurality of circuits including impedance elements, condensers, switches, and relays. Each circuit is assumed to be arranged to operate circuit contact devices when the said amplified current has a given frequency rate. This frequency rate may be different for each circuit, or it may be the same for all the circuits. In some of these selective circuits the impedance coils, relay windings, and condensers are so connected that an alternating current of less than (say) 40 cycles cannot operatively flow sufficiently to operate a given circuit contacting device. Other of the said circuits include an arrangement of the said elements whereby an alternating current of (say) more than 40 cycles cannot flow with sufficient strength to operate a circuit controlling device. Conversely some of the relays will be operated by a current of less than 40 cycles per second.

Hence I am able to operate selectively any one of the relay armatures 74, 77, and 80 by varying the number and spacing of reflectors as 3—11 with the speed of the said train remaining constant. I am also able to operate the said armatures selectively with a given number of reflectors by varying the speed of the train. I am able to indicate the status of the said signal system at a remote point due to these circuits. A lamp R shown on Fig. 1 as element 86 will be lighted when a desired relay is operable. In order to keep the circuit as simple as possible only one lamp is shown, but it is obvious that I could have indicated a lamp for each relay, or for each possible change in status of the said signal system. In any event a remote indicator may be operated on the said movable train in synchronism with the operation of the signals of the said signal system.

I have shown the plurality of selective circuits largely for reference. It is evident that a large number of relays may be operated selectively, because the light sensitive element may be affected by as many as 30,000 reflected beams per second without failing to change its resistance in synchronism with a given light variation. No such frequency may be required for the application of the invention to a train control system. However, there are other applications in which higher frequencies will be required. Accordingly, I will describe the action of the relays when used in connection with a train control system, but it is obvious that the action is not so limited. It will also be understood that the reflectors may be placed on the said movable train or vehicle, and the light affected elements placed along the track, or both reflectors and light sensitive elements may be placed on movable vehicles.

In this particular embodiment only one relay as 72 is really required for the normal control of a given train or vehicle. It can be assumed that the circuit of which 72 relay is a portion is designed for comparatively high frequencies, and that the circuit of which relay 71 is a portion is arranged for comparatively low frequencies. The relay 70 is assumed to be in series with an impedance designed to permit sufficient current to flow to operate the said relay when the frequency is very low, or what would be considered a low frequency for the purpose of this description. The armatures 74 and 80 are assumed to be normally closed or in contact due to the pull of the armature springs 76 and 82, and the armature 77 is assumed to be normally open due to the pull of the spring 79. No description will be given of the selective operation of the relay armatures as the frequency of the current changes. It is omitted because the action in general is old and known in the art of telephony. Let it be assumed that relay 72 is used in the normal operation of the device, and that relay 71 is included to describe a modification of the said normal operation or vice versa.

It should now be obvious that with the means as hereinbefore described, I can selectively operate any one of a plurality of circuit contactors from a remote point, this said selection to be caused by the certain interception of beams of reflected light by a plurality of relatively moving light affected resistance changing elements such as 27 and 28. The said selection may also be caused by a single moving light affected resistance changing element as 27 or 28, and it may additionally be caused by relatively moving selectively actuated reflectors such as 3—11 as shown by Fig. 1. The said selection may be effected by any possible combinations of moving or stationary light affected elements and reflectors.

It should be apparent that the circuit controlling elements such as armatures 74, 77, and 80 may selectively be employed to control a supply of power to a plurality of power receivers, or to vary the supply of power to a single receiver. For the sake of simplicity I have omitted means for varying a power supply to a receiver and will use only a description of means where a control is "on" or "off". Let it be assumed that the valve 98 is a portion of the steam supply of a locomotive, altho it could be a portion of the air brake system, or both. This valve 98 is normally operated by moving the plunger 97 forming a portion of a magnet actuated by a suitable current flowing in the winding 96. The power for this winding may be obtained from the direct current generator 46 when double pole switch 100 is closed to leads 92 and 60. The circuit is completed from lead 60 to the winding 96 by armature 74, contact 75, conductor 93, switch 125, lead 94, armature 80, contact 81, and lead 95. When only relay 72 is used the lead 60 is connected directly to armature 80. When relay 71 is not in use the switch 125 is closed.

The circuit of which (say) relay 72 is a portion is arranged to permit operable current to flow through the winding of relay 72 to operate same when the frequency of the said current is more than (say) 40 cycles per second. By referring to the above table, the following will be noted. As long as less than (say) 40 beams per second are intercepted by the light affected elements 27 and 28 the power control element 98 will not be affected. Hence as long as the train is moving at a speed indicated by the said signal system the power element 98 will not be affected via 72. Conversely as long as the train is moving faster than the speed indicated by the said signal system the power element 98 will be affected. The minimum speed of 15 miles per hour is used merely for description as any minimum speed may be obtained by varying the number of reflectors and the space between them, and the number of light sensitive elements such as 27 and 28.

The description is not based on the idea of abruptly stopping a moving vehicle or train, altho the relay 72 is provided with a latch 83 designed to hold the armature 85 away from the contact 81 until the latch 83 is manually or mechanically rotated about the axis 84 thereby to release the said armature and thus permit the armature 80 to be pulled into contact with closer 81 and thus again permit current to flow through the control winding 96. By this means the train or vehicle will be brought to a stop if its speed has exceeded the speed indicated by the signal system.

Normally my embodiment will cause the train to move at "caution" speed when the "caution" signal is set, and to move at a speed of (say) 15 miles per hour or stop when the "stop" signal is set.

If the vehicle or train is moving at a "proceed" speed when the "caution" signal comes on, the increase in the number of reflected beams of light as 116 and 122 as hereinbefore described will cause the frequency of the current induced in winding 48 to be increased above a frequency rate of (say) 40 per second, and hence the relay 72 will be operated until a "proceed" speed has been reached when the relay 72 will again become inoperative. Thus the power or control of the said train will be affected to automatically reduce the speed of the said vehicle to that indicated by the said signal system, and to automatically restore the power or control to the said vehicle when the proper speed has been reached. In other words the power or other speed control means will be affected by the operation of the element 98 to the effect the vehicle will move at "caution" speed. If now the train or vehicle has reached the "caution" speed and the "stop" signal comes on the frequency rate will again be increased above (say) 40 cycles per second. Relay 72 will again be operated to actuate the power control element 98 to stop the train or to cause its speed to fall to 15 miles per hour or less. If the latch 83 is operative the train will be stopped until armature 85 is released.

In any combination of lamps such as 103 and 117, light affected elements such as 27 and 28, and selectively actuated reflectors such as 3—11 the resulting product of reflected light beam interceptions must not be more than (say) 40 per second if the relay 72 is to remain inoperative. Hence the rate of frequency must not be more than (say) 40 per second if the status of the power control element 98 is to remain unaffected.

I would point out at this time that each car or unit of the said train may be equipped with light susceptible elements such as 27 and 28. With a sufficient number or groups of reflectors such as 3—10 the action of intercepting reflected beams would be continuous and the action of relay 72 would be reversed, or relay 71 could be substituted. In this event the circuit of power control element winding 96 would be held closed due to continuous alternating current flowing through the winding of (say) relay 71 when the switch 65 is closed and switch 125 is opened. If the current in winding of relay 71 should cease the spring 79 would act to pull armature 77 away from contact 102 and the winding 96 would be de-energized and the power control element 98 would operate to affect the speed of the said vehicle until the said alternating current again actuated the relay 71. Due to this arrangement a failure of any portion of the signal system, the source of light such as 103 and 117, the generator armature 46, or any portion of the light circuit organization including the light affected elements such as 27 and 28 would act to stop the train or vehicle. In addition the action as hereinbefore described may be reversed, since a vehicle may also be maintained above a certain speed by my system. I would point out that relay 72 (or relay 71) may also be employed to unlock distance controlling devices (not shown) as well as power control devices.

By closing switch 65 and opening switches 66 and 125 the relay 71 may be employed to become operative at frequencies below a rate of (say) 40 cycles per second. Hence a vehicle or train could be operated at very low speeds without otherwise changing the system, and thereby I provide a selective rate of control. This relay 71 is not held open by a latch as is relay 72 and hence the said vehicle will not be abruptly stopped by its action. Relay 70 may be designed to more or less act as a signal or indicating device, but it is shown as able to affect the circuit of the said power element 96 by action of its armature 74 and contact 75. The relay may be used to indicate the presence of alternating current of a certain frequency by the action of its contacts when the same are not in the power control circuit. A signal lamp is shown connected across its terminals so as to be lighted whenever certain current frequencies are reached by the said induced current thereby to indicate, at a remote point, the status of the said signal system. An indicator such as lamp 86 is connected in parallel with the winding of relay 71 by leads 90 and 91. A connection could have been made to armature 74 and contact 75. A lamp or some form of indicator could also be provided for each change of the said signal system. The lamp 86 is assumed to indicate "stop." Thus the operator of a vehicle or train would be provided with a duplicate at a remote point of the said signal system indicators. In addition I would point out that my invention may be applied to any desired type of vehicle. For example, vehicles designed to operate on land, water or in the air may be controlled by the act of intercepting one or more of a plurality of reflected beams of light in a desired sequence.

According to my invention it is possible to intercept reflected light and thus permit a vehicle to be controlled by its own light projected on a plurality of reflectors. The reflectors such as 3—10 in Fig. 1 may be replaced by reflectors mechanically operated as a function of the said system. The reflectors may be manually actuated. The source of light may be located on the said moving vehicle in such a manner as to direct light beams to one or more reflectors.

In conclusion, I would point out that my invention provides additional means designed to affect the power control element 98. For instance, the winding of relay 107 is energized when current is flowing through the filament of lamp 103. Should this current cease the armature 108 would be drawn away from contact 109 and current would be shut off from the winding 96 allowing the plunger 97 to operate and thus affect the power supply to the said vehicle. The same action would occur if the armature 46 failed to deliver current to the lamp 103 and the elements 27 and 28. All of the relays such as 70, 71, and 72 may be of similar design and their armatures and contacts arranged in series in the circuit of winding 96 and hence one or all of the said relays could affect the status of the said winding.

The failure of the signal system connected to leads 19, 20, 21, and 22 would cause all the reflectors as 3—10 to remain in a normal "stop" position because they would not be actuated by magnets such as 12, but would be held in normal position by the action of gravity acting on the weights 13. Such a condition would be equivalent to a "stop" condition of the signal system, and unless the said vehicle is at rest or moving at a so-called "stop" speed the increase in the rate of interception will cause the operation of the armature 80 of relay 82 as hereinbefore described and thus the train or vehicle will be stopped.

According to my invention I provide a vehicle control system that may be used in conjunction with any type of signal system, such as electrical, pneumatic, mechanical, manual, or stationary. In the case of stationary reflectors placed on dangerous curves or approaches to bridges, I am able to prevent the operator of a vehicle from passing a certain point above a certain speed.

As the moving vehicle may carry its own source of light, the necessity of sources of current along the path of the said vehicle is eliminated, and the vehicle may pass from an electrical zone to a pneumatic zone, thence to a mechanical zone, and again to an electrical zone. The force used in actuating the reflectors has no connection with the reflected beams. Because of this fact a train equipped with my control system may move from one type of signal system to another without change or adjustment.

The source of light 117 may be energized from the armature 46 or it may be considered as an emergency source and be lighted from a storage battery 126 or from any source of light such as an oil lamp.

While I have shown and described and have pointed out in the annexed claims, certain novel features of my invention, it will be understood that various omissions, substitutions and changes in the form and details of the device illustrated and in its operation may be made by those skilled in the art, without departing from the spirit of the invention.

Having thus described my invention, I claim:

1. In a device of the class described, means forming a portion of a vehicle signal system and designed to selectively reflect a plurality of beams of light, light sensitive circuit means movable across the reflected paths of the said beams thereby to intercept the said beams when reflected, means constituting a circuit organization including the said sensitive circuit means, a source of power, inductive windings, impedance elements, condensers, a plurality of circuit controlling relays, current amplifying means, and vehicle speed control means operatively connected to the above named means and designed to selectively control the speed of the said circuit moving means, according the selective reflection of the said signal means.

2. In a vehicle control system, power means arranged to be selectively controlled by selective relays, a source of alternating current of frequencies determined by the action of reflected light on a light sensitive circuit element, a source of current, inductive windings, current amplifying means, means providing the said light positioned on the said vehicle so as to cause the said light to impinge on the said element when reflected, means remotely positioned relative to the said vehicle to cause the said reflection, and means forming a portion of a signal system and designed to selectively affect the said reflecting means.

3. In a light sensitive circuit organization, means constituting a light affected resistance changing element, means for moving the said element within the path of a beam of remotely reflected light in a desired sequence whereby a current flowing in the circuit of which the said element is a portion will be varied in the same sequence, and inductive means operatively associated with the said light affected circuit thereby in effect to convert the said varying current into alternating current.

4. In a device of the class described, means constituting a light sensitive current varying element, means for positioning the said element in the reflected paths of a plurality of rays of light reflected from remote points at selective combinations of numbers and spacing, said element so moved relative to the said points as to consecutively intercept the said reflected rays whereby current flowing in the said element will be varied in synchronism with the said interception, inductive means operatively associated with the said current varying means designed to change the said varying current into alternating current with a frequency proportional to the said interception, impedance elements operatively associated with the said inductive means designed to selectively permit certain circuit controlling elements to receive certain of the said alternating currents, power controlling means constituting the said circuit elements selectively operable by the said received currents to additionally control other power controlling means, means constituting the source of the said light rays, means constituting the said remote reflecting points, means for supplying the said varying current, and means for supplying current to the second named power control means.

5. In a train control system, means constituting light sensitive current varying elements, means for moving the said elements within the paths of a plurality of beams of reflected light originating on the said train, said element arranged to intercept the said rays as they are selectively reflected from fixed surfaces positioned along the track of the said train, said interception occurring in a desired sequence whereby a current flowing in the circuit of which the said elements may be a portion will be varied in synchronism with the said sequence, inductive means operatively associated with the said circuit including the said light sensitive current varying means to change the said periodically varying current into alternating current with a frequency proportional to the said rate of sequential interception, impedance elements operatively associated with the said inductive means, certain of said impedance means designed to oppose certain of said alternating currents and to permit certain other alternating currents to selectively flow to power control elements thereby to selectively operate same and thus control the speed of the train, means providing an additional source of power to actuate the said power control elements, means constituting a current amplifier and including a variable frequency uni-polar generator arranged to have its field excited by the said alternating current, means constituting the source of the said rays, and means providing the current to be varied in the said sensitive element.

6. In a device of the class described, the combination of a beam of light, means for producing the said beam, sources of current, inductive means, current amplifying elements, impedance elements, means for cooperatively associating the above named means whereby the beam of light will selectively control a power control means due to the sequential interception of the said beam when reflected on the said light affected elements, and means for sequentially controlling the said interception constituting selective reflector actuating means.

7. In a train control system, the combination of a plurality of light reflectors, a plurality of beams of light, a light susceptible circuit element, a plurality of current sources, a current amplifying organization, inductive elements, impedance elements, and a plurality of train control elements, means for operatively associating the above named means whereby the said train control elements are selectively controlled by the combined action of the beam of light when reflected on the said susceptible element and the speed of the train, and means for selectively controlling the reflecting action of the said reflectors.

8. In a device of the class described, stationary means for selectively reflecting a beam of light originating on a movable vehicle, means also positioned on the said vehicle constituting a light sensitive current changing element arranged to intercept the said beam as it is intercepted and reflected by the said selective reflecting means, and means constituting a circuit organization including the said light sensitive element and designed to have its status changed by a change in the rate of the said interception.

9. In a device of the class described, means selectively providing a plurality of beams of reflected light, moving means for intercepting the said reflected beams in a desired manner including a light susceptible circuit organization, and means associated with the said circuit means designed to selectively control the speed of a vehicle proportional to the rate of the said selective interception during a given interval of time.

10. In a train control system, means for producing beams of light on a moving vehicle, means for selectively reflecting the said beams back to the said vehicle, means positioned on the said vehicle arranged to intercept the said reflected beams and constituting a light sensitive resistance changing element forming a portion of a train control system, means providing a current generator designed to amplify current converted by the said system, means including a selective control circuit organization operatively connected to the said amplifying generator, and power control means designed to be selectively operated by the said selective control circuit organization.

11. In a train control system, means for reflecting a beam of light from a stationary surface to a light affected element on a movable vehicle, and means associated with the said element designed to create alternating current with a frequency proportional to the speed of the said vehicle and thereby control the speed of the said vehicle due to said reflection.

12. In a remote control system, a plurality of light reflectors movable to and from an operative status by portions of a signal system, a plurality of light beams originating from a movable vehicle and designed to impinge on the surface of the said reflectors as the said vehicle is moved thereby to be reflected to the active surface of a light sensitive element forming a portion of a circuit including a source of power, said circuit also positioned on the said movable vehicle and designed to have its status changed by a change in said reflection due to a change in the operative status of the said reflector, and indicator means operatively associated with the said circuit thereby to be selectively affected so as to indicate on the said vehicle the said reflector change of status.

13. In a speed control system, means for creating a beam of light, means for reflecting the said beam a given number of times in a given interval of time, means for affecting the said intermittent reflection constituting power control means of a movable vehicle, and means constituting a light affected circuit organization designed to affect the said power control means proportional to the said reflecting interval.

14. In a control system for vehicles, the combination of means providing reflected rays of energy, means constituting a control circuit organization movable with the said rays and including a ray sensitive resistance changing element positioned so as to intercept the said reflected rays in a desired order, a source of current, inductive means in series with the said element and said source of current, other inductive means operatively associated with the first named inductive means, impedance elements designed to be selectively affected by alternating current according to the frequency of the said current and operatively associated with the last named inductive means, circuit controlling relays operatively connected to certain of the said impedance elements to be selectively actuated by current flowing through one of the said impedance elements, and means for connecting the above named means.

15. In a remote controlled current amplifying system, the combination of a circuit organization including a light affected element, a source of current, and a transformer winding, means designed to project a reflected beam of light on the active surface of the said element in a desired intermittent order in proportion to the speed of a vehicle carrying the said circuit organization, said projection thereby varying the current in the circuit including the light affected element at the same consecutive order in the said transformer winding, and means constituting a second transformer winding whereby the said consecutive current variations will be transformed into alternating current of the same consecutive alternations, and means constituting a synchronous unipolar generator designed to be excited by the said transformed current thereby to generate an amplified current of a frequency proportional to the speed of the said vehicle.

16. In a remote selectively controlled current converter, the combination of a circuit organization including a light affected resistance changing element, a source of current, a source of light, and a transformer winding, means providing and positioning a plurality of selective reflectors of light whereby a movement of the said light affected element and the said source of light relative to the surfaces of the said reflectors in a desired consecutive sequence will vary the said current at the same sequence in the said transformer winding, and means constituting a second transformer winding inductively associated with the first named winding whereby the said current variations will in effect become alternating current of a frequency depending on the status of the said reflectors and the speed relation of the said element and the said reflectors.

17. In a selective remote control device, means designed by its movement during a given interval to determine its movement during another interval, and means associated with the said moving means designed to be selectively affected by the status of a reflecting means so as to create variable frequency alternating current thereby to selectively affect the movement of the said moving means.

18. In a signal system, the combination of means providing a plurality of reflecting surfaces positioned relative to each other and to a given line, movable means providing a beam of light designed to be intercepted and reflected by the said surfaces according to the speed of the said movable means, and means carried by the said movable means arranged to intercept the said reflected beams so as to create alternating current with a frequency proportional to the rate of the said interruption thereby to selectively control the movement of the said movable means.

19. In a remote selective light controlled system, the combination of a light affected circuit element, a source of current, inductive windings, a synchronous amplifying generator, impedance windings, switches, condensers, relays, indicators, a second source of current, and current actuated control members, means for connecting the above named elements in a desired circuit organization, means for moving the said light controlled system relative to a plurality of selectively actuated reflectors of light whereby the said light affected element will intercept the said selectively reflected beams, means for providing the said beams of light, means operable by the status of the said light providing means, means providing the said reflectors constituting a portion of a signal system, and means for connecting the above named means in desired circuit relation whereby a certain rate of movement of the said light affected element, or a change in status of the said beam, will selectively actuate the said indicators and the said control members.

20. In a selective remote control system for movable vehicles, the combination of means selectively providing a plurality of beams of light reflected in desired combinations of numbers and relative positions, means constituting a remote selective control system including a light affected element, a source of current, inductive means in circuit with the said element and said source of current, a second inductive means operatively associated with the first named inductive means, impedance means designed to be selectively affected by the current from the said amplifying means, circuit controlling relays operatively connected to certain of the said impedance elements thereby to be selectively actuated by certain alternating currents flowing through certain of the said impedance means, additional relays actuated by the status of current generated as a function of the movement of the said vehicle, means constituting power control elements arranged to affect the movement of the said vehicle normally and to be additionally operated by the said relays, means for selectively affecting the said reflectors, and means for connecting the above named means in desired circuit relation.

Signed at Brooklyn, N. Y., in the county of Kings and State of New York this 6th day of April, A. D. 1928.

HOWARD J. MURRAY.